US012783337B2

(12) United States Patent
Shum et al.

(10) Patent No.: US 12,783,337 B2
(45) Date of Patent: Nov. 3, 2026

(54) UPDATING CALL HOME DATA LIMITS AND PRIORITIES

(71) Applicant: INTERNATIONAL BUSINESS MACHINES CORPORATION, Armonk, NY (US)

(72) Inventors: Stephanie Carys Shum, Wappingers Falls, NY (US); Patrick John Clas, Pine Plains, NY (US); Pasquale A. Catalano, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 18/499,302

(22) Filed: Nov. 1, 2023

(65) Prior Publication Data

US 2025/0138930 A1 May 1, 2025

(51) Int. Cl.
*G06F 11/07* (2006.01)

(52) U.S. Cl.
CPC ...... *G06F 11/0787* (2013.01); *G06F 11/0709* (2013.01); *G06F 11/079* (2013.01)

(58) Field of Classification Search
CPC . G06F 11/0787; G06F 11/0709; G06F 11/079
See application file for complete search history.

(56) References Cited

U.S. PATENT DOCUMENTS

| | | | | |
|---|---|---|---|---|
| 10,097,609 | B1 * | 10/2018 | Lasher | H04L 65/61 |
| 10,255,622 | B2 * | 4/2019 | Scarasso | G16H 40/20 |
| 10,572,330 | B2 | 2/2020 | Barr et al. | |
| 11,620,528 | B2 | 4/2023 | Ryan et al. | |
| 11,907,102 | B2 * | 2/2024 | Kumar A | G06F 11/3636 |
| 2009/0012748 | A1 * | 1/2009 | Beish | G06F 11/3636 702/187 |
| 2011/0209091 | A1 * | 8/2011 | Bucciarelli | H04L 41/22 715/764 |
| 2016/0028845 | A1 | 1/2016 | Barr et al. | |
| 2017/0054603 | A1 | 2/2017 | Kulkarni et al. | |
| 2018/0024909 | A1 | 1/2018 | Broussard et al. | |
| 2018/0115477 | A1 * | 4/2018 | Jhoney | H04L 43/0894 |
| 2020/0334125 | A1 * | 10/2020 | Degaonkar | H04L 43/0817 |
| 2021/0232465 | A1 * | 7/2021 | Neier | G06F 11/1461 |

* cited by examiner

*Primary Examiner* — Jigar P Patel
(74) *Attorney, Agent, or Firm* — Onyx IP Group

(57) ABSTRACT

Updating of call home data limits and priorities includes receiving problem analysis data associated with a defect of a computing system, and determining a bandwidth value associated with the computing system. A size limit for a debug data file for storing the problem analysis data is determined based on the bandwidth value. The size limit for the debug data file is adjusted based on a severity of a reference code associated with the defect of the computing system.

20 Claims, 7 Drawing Sheets

UPDATING CALL HOME DATA LIMITS AND PRIORITIES

BACKGROUND

The present disclosure relates to methods, apparatus, and products for updating call home data limits and priorities.

SUMMARY

According to embodiments of the present disclosure, various methods, apparatus and products for updating call home data limits and priorities are described herein. In some aspects, updating of call home data limits and priorities includes receiving problem analysis data associated with a defect of a computing system, and determining a bandwidth value associated with the computing system. A size limit for a debug data file for storing the problem analysis data is determined based on the bandwidth value. The size limit for the debug data file is adjusted based on a severity of a reference code associated with the defect of the computing system.

DETAILED DESCRIPTION

Figure 1:
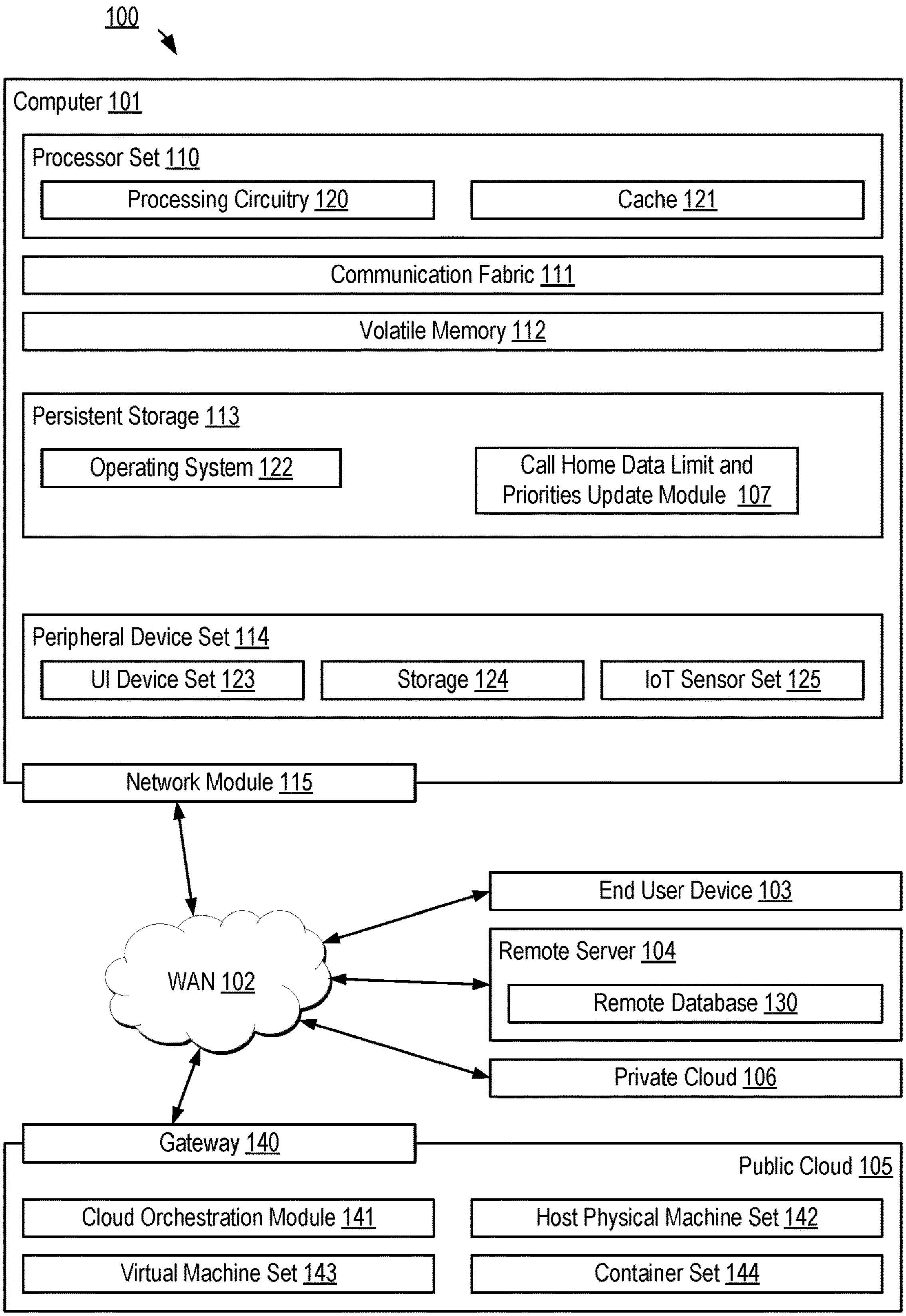
FIG. 1 sets forth an example computing environment according to aspects of the present disclosure.

Problem analysis data is used for identifying and correcting defects, such as software or hardware errors, which may arise related to a service or other programs provided by a computing system. The problem analysis data includes information related to identifying a cause of the defect such as files created or accessed during providing of the service, and is often collected at the computing system by one or more agents during execution of the service or program. For defects that are not readily repairable locally at the computing system, the problem analysis data is often transmitted to a service provider associated with the computing system for further analysis, referred to as a "call home" communication. The service provider may then determine steps necessary for correcting the defect and either communicate the steps to a customer associated with the computing system or perform the steps remotely to correct the defect.

The problem analysis data is often collected in a primary debug data file that often has a limited file size. The problem analysis data is often manually ranked according to a priority (e.g., a high, medium, or low priority), and only the higher priority is placed in the primary debug data file due to the file size constraints. In cases in which the amount of data collected once compressed is larger than the limit, data is often placed in the file from smallest to largest. Any data not included in the primary debug data file is often found in a separate file including all of the problem analysis data. However, if this additional data is required by the service provider for determining the cause of the defect, a "more information" request from the service provider is required to retrieve the additional information from the computing system.

When a "more information" request by the service provider is necessary additional support cost by the service provider and customer downtime is incurred while the service provider determines the problem and remedies required to resolve the defect. Current approaches can cause important problem analysis data to be omitted. In some cases, large data dumps can cause other crucial high priority information to be omitted.

Various embodiments provide for more accurate determination of optimal debug data file size limits and identification of information that needs to be collected to resolve defects in a service or program provided by the computing system. As a result, various embodiments minimize or eliminate the need to send "more information" requests by the service provider to resolve a defect. In addition, often data is pruned or deleted after a period of time has elapsed. If too much time has passed since collection for the problem analysis data to be retrievable by a "more information" request, the dynamic debug data file size determination and prioritized data collection described with respect to various embodiments allow for prevention of such data loss that could be critical for use in solving a problem.

Various embodiments provide for updating limits and priorities for call home data, such as problem analysis data, by measuring and utilizing bandwidth to gauge an optimal size for a primary debug data file for a computing system. For example, a greater amount of available bandwidth allows for a larger primary debug data file size. In particular embodiments, a bandwidth value is determined based on bandwidth data such as connection type, time of day, and current traffic of the computing system. In a particular embodiment, a weighted ranking of bandwidth data is utilized to determine the bandwidth value. Within this bandwidth window, a usage heatmap may be utilized in addition to weighted ranking of the problem analysis data to prioritize the problem analysis data to place into the primary debug data file. In particular embodiments, a confidence score associated with problem analysis data may be utilized to prioritize the problem analysis data as further described herein. Additionally, in various embodiments, a severity of a reference code associated with a defect is used to further update the size limit for the primary debug data file. A reference code is code value that is indicative of a diagnostic result of the computing system associated with a particular defect. For example, different types of hardware or software defects/error may be assigned a unique reference code. A severity of a reference code represents a relative severity of the defect associated with the reference code. In particular embodiments, the severity data is linked to defects that are related to a specific reference code. In particular embodiments, the linking of the reference codes and severities are input by one or more users.

In one or more embodiments, a computing system determines a bandwidth value associated with the computing system, and determines a size limit for a debug data file for storing the problem analysis data based on the bandwidth value. The computing system collects problem analysis data associated with a service provided by the computing system during execution of the service. Upon occurrence of a defect, such as software or hardware error, associated with the service, the computing system receives the problem analysis data associated with the defect usage, and determines a priority value of the problem analysis data. In particular embodiments, the computing system determines the priority of the problem analysis data associated with the defect based on usage data of previous problem analysis data associated with the defect, a size of the problem analysis data, and a confidence score associated with the previous problem analysis data. In particular embodiments, the usage data includes a frequency of access of a particular file or other data during previous analysis of the defect. The computing system calculates the confidence score associated with the previous problem analysis data based on the amount of time necessary to resolve the defect, and/or whether the defect was resolved with the data collected or additional information was needed via a "more information" request. For example, a higher amount of time necessary to resolve the defect may result in a higher confidence score, whereas a lower amount of time necessary to resolve the defect may result in a lower confidence score. In another example, the necessity to send a "more information" request may result in a lower confidence score and vice versa. The computing system determines whether to include the problem analysis data in the debug data file based on the priority value, and stores the problem analysis data in the debug data file if the priority value indicates that the problem analysis data is to be included in the data collection.

In various embodiments, the computing system adjusts the size limit for the debug data file based on a severity of a reference code associated with the defect of the computing system. In some embodiments, the reference code is indicative of a diagnostic result of the computing system associated with the defect. In some embodiments, the severity of the reference code is based on an association of severity data to the defect related to the reference code.

FIG. 1 sets forth an example computing environment according to aspects of the present disclosure. Computing environment 100 contains an example of an environment for the execution of at least some of the computer code involved in performing the various methods described herein, such as call home data limit and priorities update module 107. In addition to call home data limit and priorities update module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and call home data limit and priorities update module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Such computer processors as well as graphic processors, accelerators, coprocessors, and the like are sometimes referred to herein as a processing device. A processing device and a memory operatively coupled to the processing device are sometimes referred to herein as an apparatus. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in call home data limit and priorities update module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in call home data limit and priorities update module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
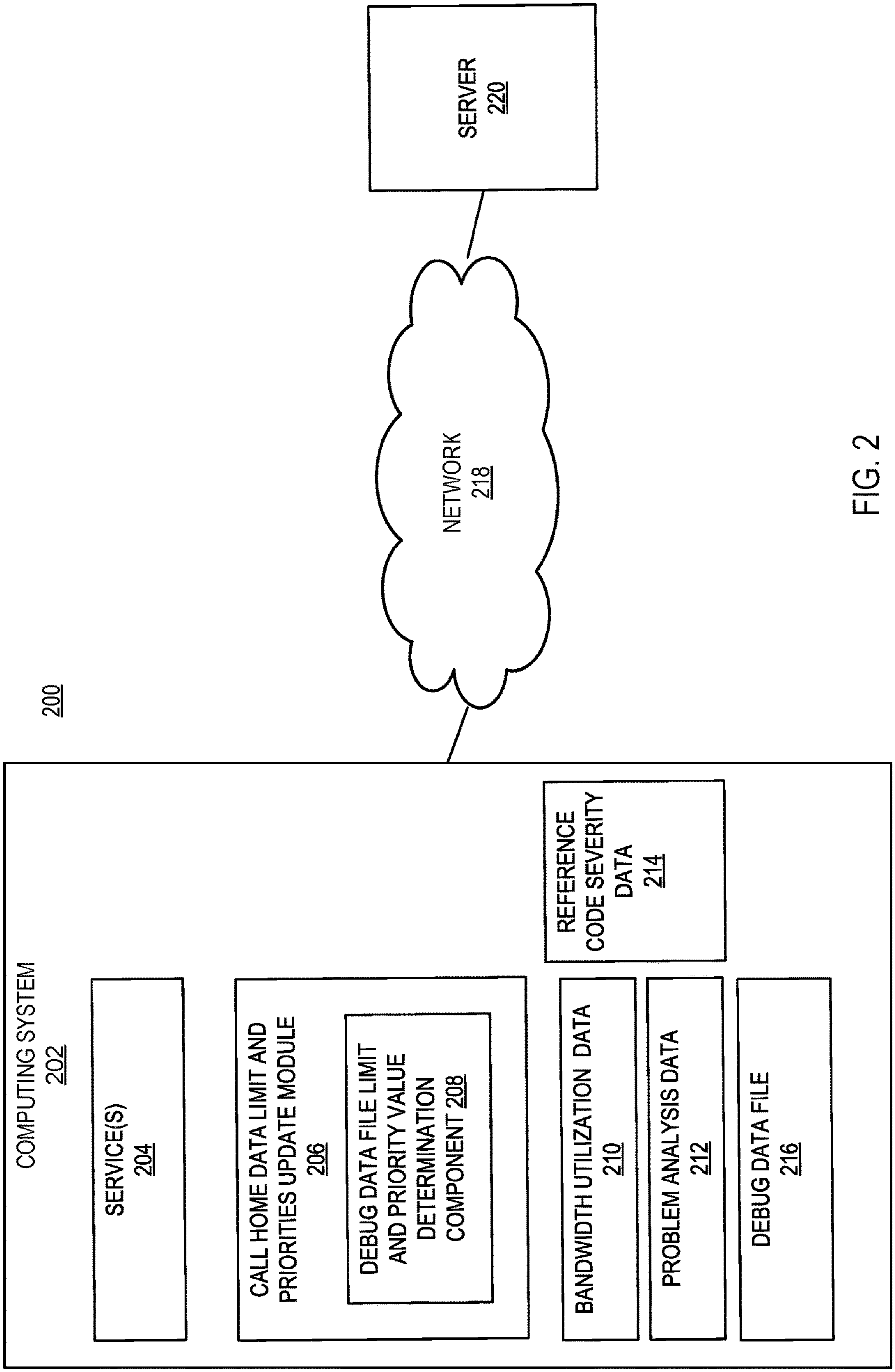
FIG. 2 sets forth another example computing environment according to aspects of the present disclosure.

Referring now to FIG. 2, FIG. 2 sets forth another example computing environment according to aspects of the present disclosure. Computing environment 200 includes a computing system 202. In a particular embodiment, the computing system 202 includes the computer 101 described with respect to FIG. 1. The computing system 202 includes one or more services 204 and a call home data limit and priorities update module 206. The one or more services 204 may include one or more services being provided by the computing system 202 such as database services. The call home data limit and priorities update module 206 includes a debug data file limit and priority value determination component 208 configured to perform the functions related to determining a priority value of problem analysis data 210 associated with a defect and determining whether to include the problem analysis data in a data collection. In a particular embodiment, the debug data file limit and priority value determination component 208 is configured to determine size limit of debug data file 216 and a priority value of problem analysis data 212. In an embodiment, the call home data limit and priorities update module 206 includes the call home data limit and priorities update module 107 of FIG. 1.

In one or more embodiments, the size limit of the debug data file 216 is determined based on a bandwidth value associated with the computing system determined from bandwidth utilization data 212. In a particular embodiment, the priority value of the problem analysis data is determined based on usage data of previous problem analysis data associated with the defect, a size of the problem analysis data, and a confidence score associated with the previous problem analysis data as described herein with respect to various embodiments.

The debug data file limit and priority value determination component 208 is further configured to adjust the size limit for the debug data file based on a severity of a reference code associated with the defect of the computing system using reference code severity data 214.

The computing environment 200 further includes a server 220 in communication with the computing system 202 via a network 218. In a particular embodiment, the server 220 is associated with a service provider of the one or more services 204. In one or more embodiments, the computing system 202 is configured to transmit the debug data file 216 to the server 220 for analysis to determine a cause of the defect.

Figure 3A:
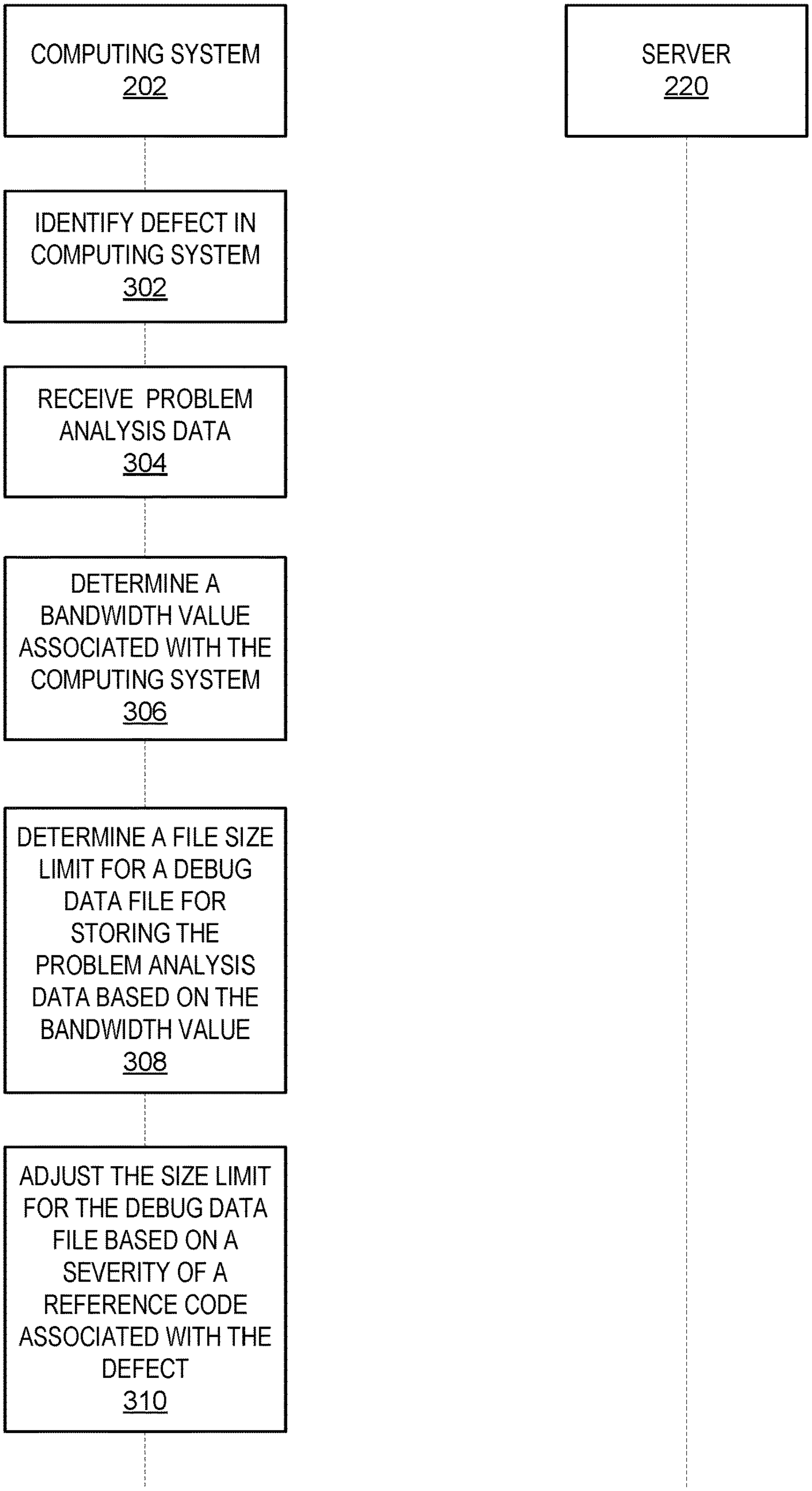
FIGS. 3A-3C set forth an example of a process flow for the computing environment of FIG. 2 according to aspects of the present disclosure.
Figure 3B:
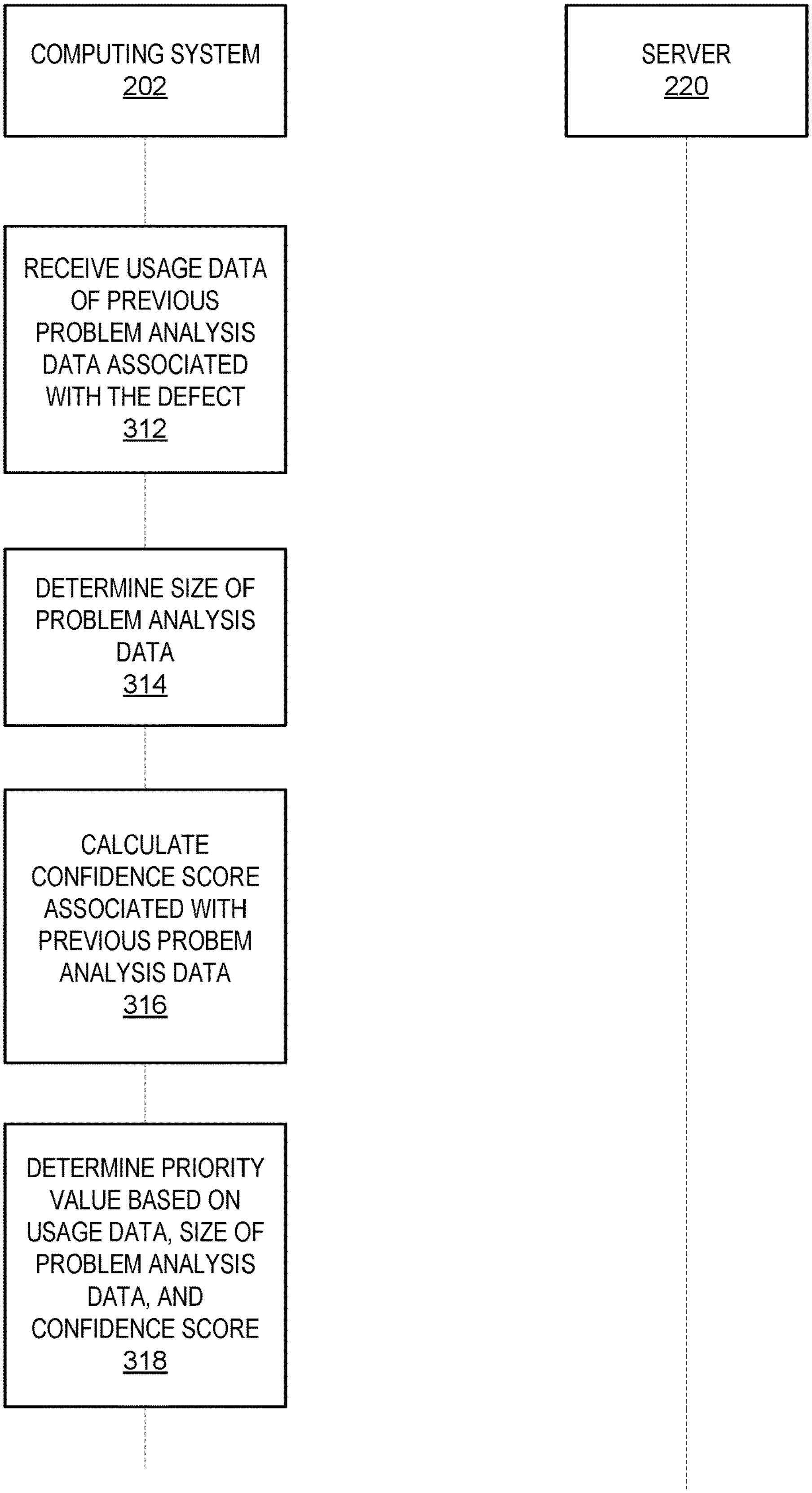
Figure 3C:
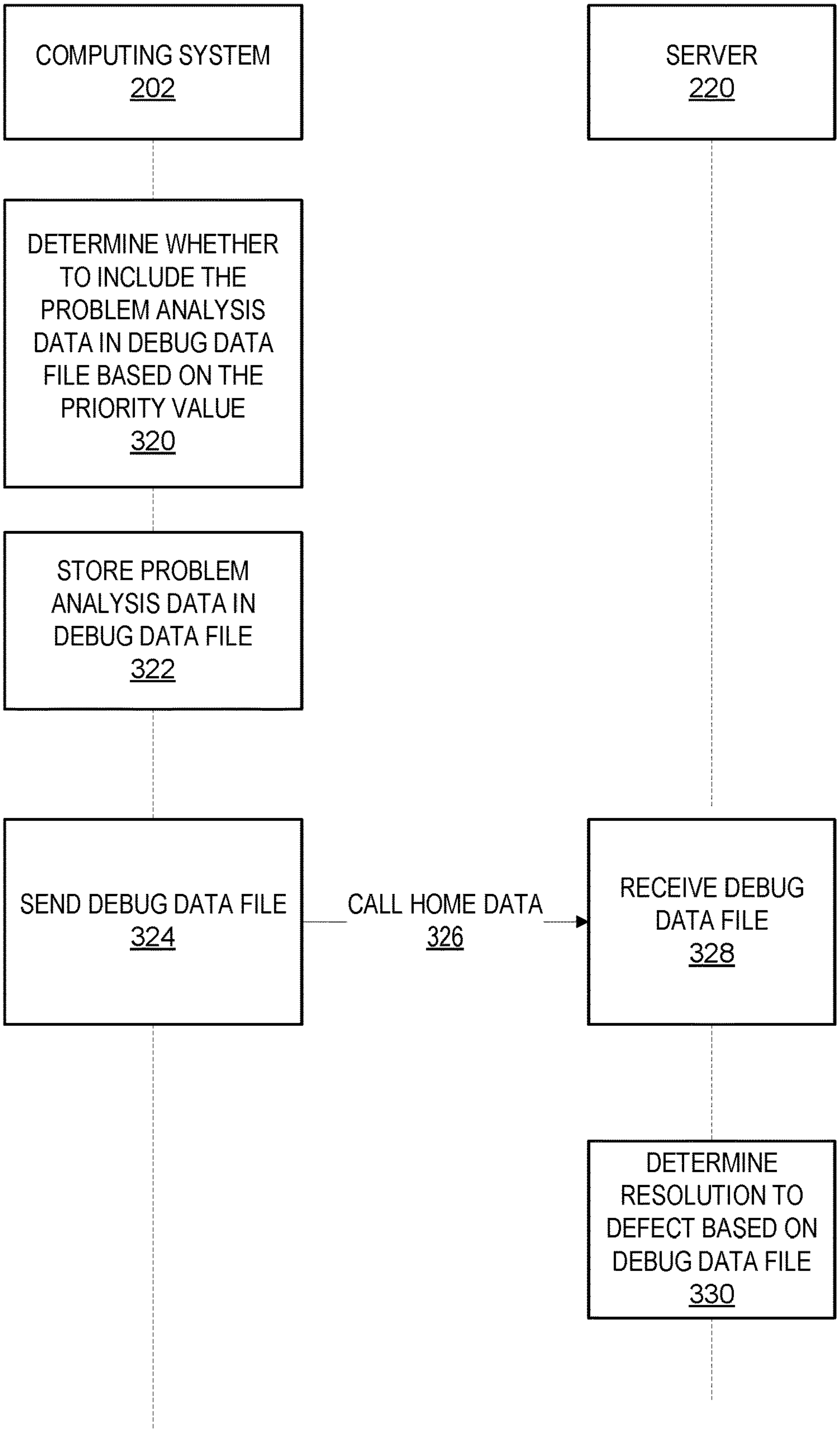

Referring now to FIGS. 3A-3C, FIGS. 3A-3C set forth an example of a process flow for the computing environment of FIG. 2 according to aspects of the present disclosure. Referring to FIG. 3A, in the process flow the computing system 202 identifies 302 a defect in the computing system 202. In a particular embodiment, the defect is a software or hardware error associated with a service provided by the computing system 202. The computing system 202 receives 304 problem analysis data associated with the defect. In particular embodiments, the problem analysis data is collected by software agents during execution of the service.

The computing system 202 determines 306 a bandwidth value associated with the computing system 202. In a particular embodiment, the bandwidth value is indicative of an available or expected bandwidth of the computing system 202. In particular embodiments, the bandwidth value is determined based on bandwidth data such as connection type, time of day, and current traffic of the computing system. The computing system 202 determines 308 a file size limit for the debug data file for storing the problem analysis data based on the bandwidth value. For example, a greater amount of available bandwidth allows for a larger debug data file size limit. The computing system 202 adjusts 310 the size limit for the debug data file based on a severity of a reference code associated with the defect of the computing system.

Referring now to FIG. 3B, the computing system 202 receives 312 usage data of previous problem analysis data associated with the defect. In particular embodiments, the previous problem analysis data is problem analysis data that was collected during a previous occurrence of the same defect. In one or more embodiments, the usage data includes an identification of frequency of usage of particular files associated with the service during the previous occurrence of the defect. In one or more embodiments, the usage data is represented in a usage heat map including a graphical representation of file usage.

The computing system determines 314 a size of the program analysis data associated with the defect and calculates 316 a confidence score associated with the previous problem analysis data. In one or more embodiments, the confidence score is representative of a degree of confidence that the problem analysis data is useful for resolving the defect. In a particular embodiment, the confidence score is determined based upon an amount of time necessary to resolve the defect. For example, a higher amount of time necessary to resolve the defect may result in a higher confidence score as representative of a greater amount of effort utilized to resolve the error using the previous problem analysis data. In contrast, a lower amount of time necessary to resolve the defect may result in a lower confidence score. In another example, whether a “more information” request was received from the server 220 may be used to determine the confidence score. If no “more information” request was needed to resolve the previous defect, the problem analysis data may be given a higher confidence score representative of the problem analysis data being sufficient to resolve the defect. In contrast, of a “more information” request was necessary, the previous problem analysis data may be given a lower confidence score representative of the previous problem analysis data being insufficient to resolve the defect.

The computing system 202 determines 318 a priority value for the problem analysis data based on the usage data of the previous problem analysis data, the size of the problem analysis data, and the confidence score of the previous problem analysis data. In a particular embodiment, the priority value for the problem analysis data is determined by calculating a weighted average of the usage data of the previous problem analysis data, the size of the problem analysis data, and the confidence score of the previous problem analysis data.

Referring now to FIG. 3C, the computing system 202 determines 320 whether to include the problem analysis data in the debug data file based on the priority value. In a particular embodiment, the computing system determines to include the problem analysis data in the debug data file based on the priority value being greater than or equal to a predetermined threshold value.

Based on a determination that the problem analysis data is to be included in the data collection, the computing system 202 stores 322 the problem analysis data in the debug data file. The computing system 202 sends 324 the debug data file to the server 220 within call home data 326. The server 220 receives 328 the debug data file. A resolution to the defect is determined 330 based on the debug data file. In a particular embodiment, the resolution to the defect is determined by users associated with the service provider utilizing the debug data file. In another particular embodiment, the resolution to the defect is determined by the server 220 based on the debug data file.

Figure 4:
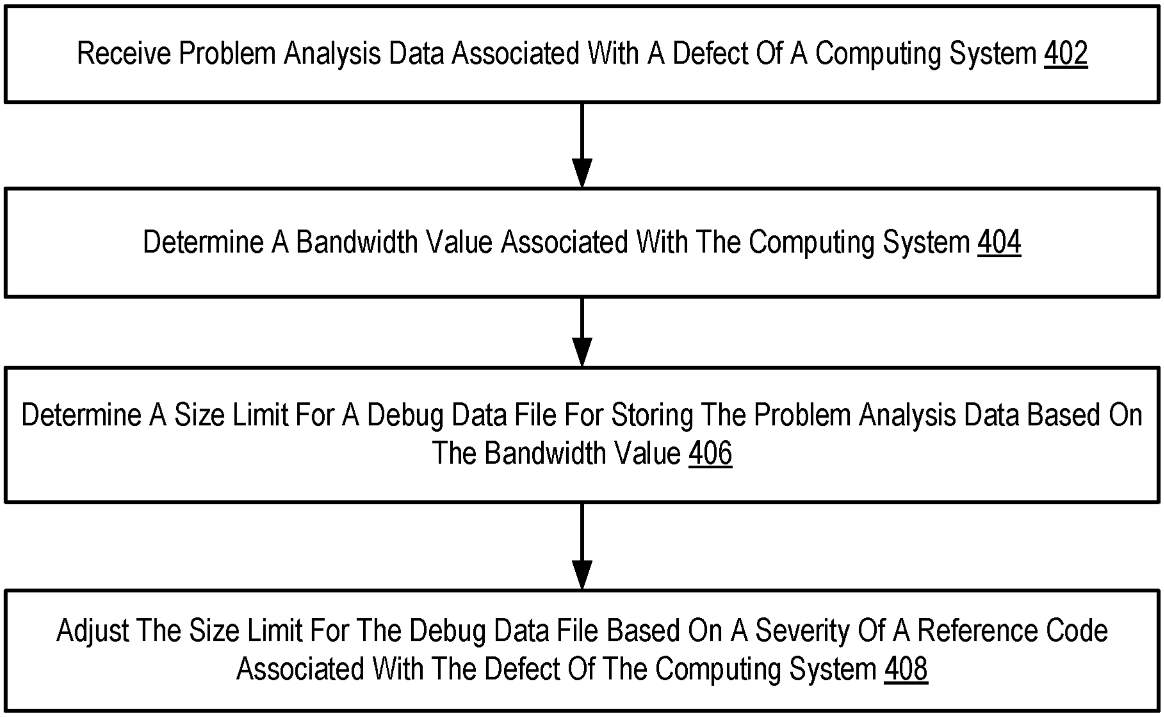
FIG. 4 sets forth a flowchart of an example process for updating call home data limits and priorities according to aspects of the present disclosure.

Referring now to FIG. 4, FIG. 4 sets forth a flowchart of an example process for updating call home data limits and priorities according to aspects of the present disclosure. The computing system 202 receive 402 problem analysis data associated with a defect of a computing system. In one or more embodiments, the process of FIG. 4 is initiated by determining that a defect has occurred in the computing system 202 such as a hardware or software defect in a service provided by the computing system 202. In a particular embodiment, the problem analysis data comprises a data file. The computing system 202 determines 404 a bandwidth value associated with the computing system.

The computing system 202 determines 406 a size limit for a debug data file for storing the problem analysis data based on the bandwidth value. The computing systems 202 adjusts 408 the size limit for the debug data file based on a severity of a reference code associated with the defect of the computing system. In particular embodiments, the reference code is indicative of a diagnostic result of the computing system 202 associated with the defect. In particular embodiments, the severity of the reference code is based on an association of severity data to the defect related to the reference code.

Figure 5:
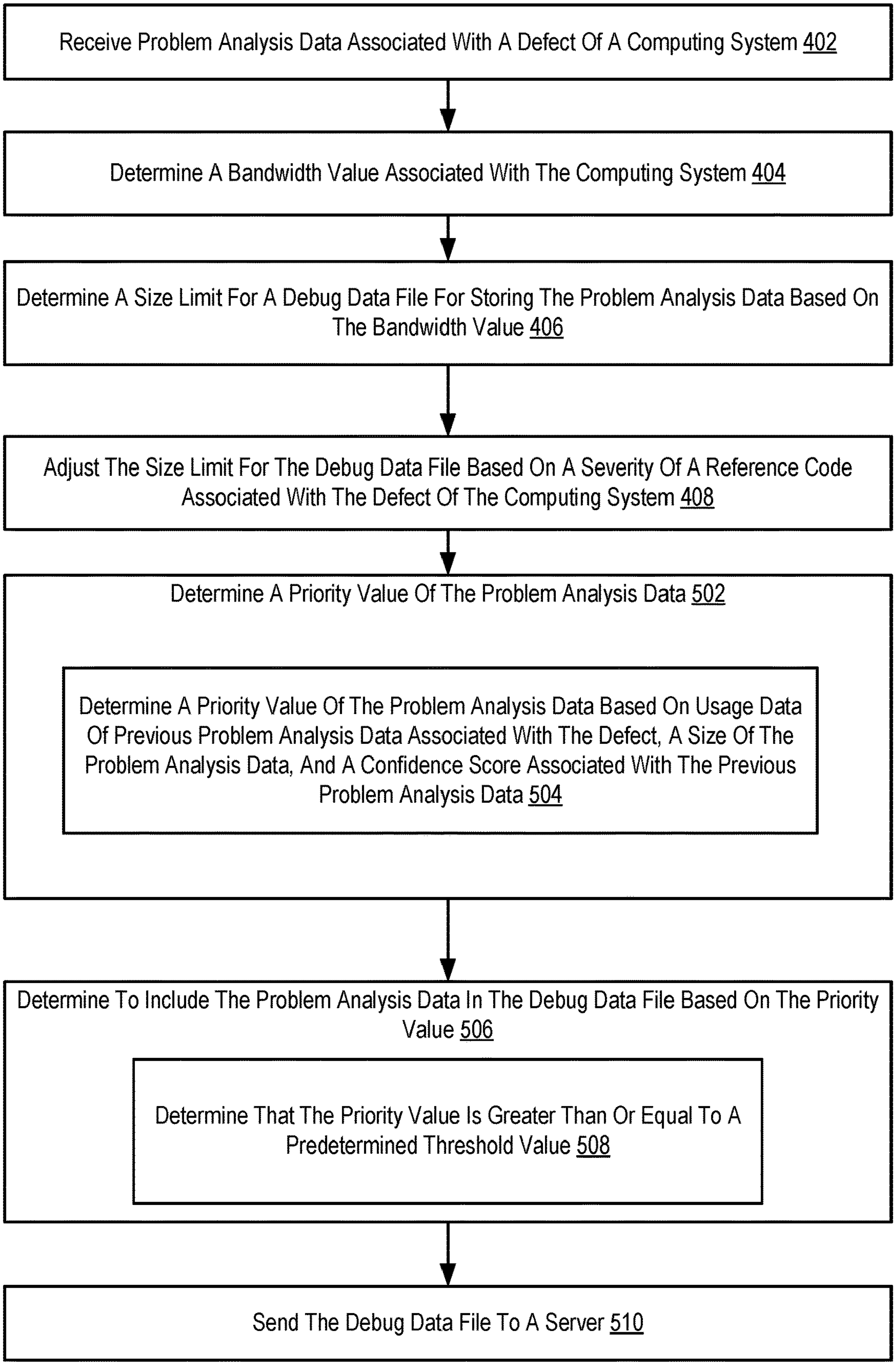
FIG. 5 sets forth a flowchart of another example process for updating call home data limits and priorities according to aspects of the present disclosure.

Referring now to FIG. 5, FIG. 5 sets forth a flowchart of another example process for updating call home data limits and priorities according to aspects of the present disclosure. The example process of FIG. 5 includes the steps described with respect to the example process of FIG. 4 and further includes determining 502 a priority value of the problem analysis data. In particular embodiments, determining 502 the priority value of the problem analysis data includes determining 504 the priority value of the problem analysis data based on usage data of previous problem analysis data associated with the defect, a size of the problem analysis data, and a confidence score associated with the previous problem analysis data.

In particular embodiments, the process further includes calculating the confidence score associated with the previous problem analysis data based on an amount of time necessary to resolve the defect. In other particular embodiments, the process further includes calculating the confidence score associated with the previous problem analysis data based on whether additional problem analysis data was requested to resolve the defect.

The computing system 202 determines 506 to include the problem analysis data in the debug data file based on the priority value. In a particular embodiment, determining 506 to include the problem analysis data in the debug data file based on the priority value includes determining 508 that the priority value is greater than or equal to a predetermined threshold value. The example process of FIG. 5 may further include sending 510 the debug data file to a server. In a particular embodiment, the server determines a resolution of the defect based on the debug data file and communicates the resolution of the defect to the computing system 202. In another particular embodiment, one or more users associated with a service provider utilize the debug data file to determine a resolution to the defect. The one or more users associated with the service provider may communicate the resolution to the computing system 202 and/or users associated with the computing system 202, or perform an action to resolve the defect.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

detecting a defect of a computing system;

receiving problem analysis data associated with the defect of the computing system;

determining a bandwidth value associated with the computing system, wherein the bandwidth value is determined based on a connection type of the computing system and current traffic of the computing system;

determining a size limit for a debug data file for storing the problem analysis data based on the bandwidth value;

performing a diagnostic of the computing system associated with the defect;

adjusting the size limit for the debug data file based on a severity of a reference code associated with the defect of the computing system, wherein the reference code is indicative of a diagnostic result of the diagnostic performed on the computing system;

determining a priority value of the problem analysis data based on usage data of previous problem analysis data associated with the defect, a size of the problem analysis data, and a confidence score associated with the previous problem analysis data, wherein the priority value is determined by calculating a weighted average of the usage data of the previous problem analysis data, the size of the problem analysis data, and the confidence score of the previous problem analysis data; and determining whether to include the problem analysis data in the debug data file based on the priority value.

2. The method of claim 1, wherein the reference code is indicative of a relative severity of the defect.

3. The method of claim 1, wherein the severity of the reference code is based on an association of severity data to the defect related to the reference code.

4. The method of claim 1, further comprising storing the problem analysis data in the debug data file.

5. The method of claim 1, wherein the confidence score, associated with the previous problem analysis data, is calculated based on an amount of time to resolve the defect and whether additional problem analysis data was requested to resolve the defect.

6. The method of claim 1, further comprising calculating the confidence score associated with the previous problem analysis data based on an amount of time necessary to resolve the defect.

7. The method of claim 1, further comprising calculating the confidence score associated with the previous problem analysis data based on whether additional problem analysis data was requested to resolve the defect.

8. The method of claim 1, wherein determining to include the problem analysis data in the debug data file comprises determining that the priority value is greater than or equal to a predetermined threshold value.

9. The method of claim 1, wherein the defect comprises a software defect of the computing system.

10. The method of claim 1, wherein the problem analysis data comprises a data file.

11. The method of claim 1, further comprising sending the debug data file to a server.

12. An apparatus comprising:

a processing device; and memory operatively coupled to the processing device, wherein the memory stores computer program instructions that, when executed, cause the processing device to:

detect a defect of a computing system;

receive problem analysis data associated with the defect of the computing system;

determine a bandwidth value associated with the computing system, wherein the bandwidth value is determined based on two or more of a connection type of the computing system, a time of day, or current traffic of the computing system;

determine a size limit for a debug data file for storing the problem analysis data based on the bandwidth value;

perform a diagnostic of the computing system associated with the defect;

adjust the size limit for the debug data file based on a severity of a reference code associated with the defect of the computing system, wherein the reference code is indicative of a diagnostic result of the diagnostic performed on the computing system;

determine a priority value of the problem analysis data based on usage data of previous problem analysis data associated with the defect, a size of the problem analysis data, and a confidence score associated with the previous problem analysis data, wherein the priority value is determined by calculating a weighted average of the usage data of the previous problem analysis data, the size of the problem analysis data, and the confidence score of the previous problem analysis data; and determine whether to include the problem analysis data in the debug data file based on the priority value.

13. The apparatus of claim 12, wherein the reference code is indicative of a relative severity of the defect.

14. The apparatus of claim 12, wherein the severity of the reference code is based on an association of severity data to the defect related to the reference code.

15. The apparatus of claim 12, wherein the computer program instructions, when executed, cause the processing device to determine a priority value of the problem analysis data.

16. The apparatus of claim 12, wherein the confidence score, associated with the previous problem analysis data, is calculated based on an amount of time to resolve the defect and whether additional problem analysis data was requested to resolve the defect.

17. A computer program product comprising a computer readable storage medium, wherein the computer readable storage medium comprises computer program instructions that, when executed:

detect a defect of a computing system;

receive problem analysis data associated with the defect of the computing system;

determine a bandwidth value associated with the computing system;

determine a size limit for a debug data file for storing the problem analysis data based on the bandwidth value, wherein the bandwidth value is determined based on a connection type and current traffic of the computing system;

perform a diagnostic of the computing system associated with the defect;

adjust the size limit for the debug data file based on a severity of a reference code associated with the defect of the computing system, wherein the reference code is indicative of a diagnostic result of the diagnostic performed on the computing system;

determine a priority value of the problem analysis data based on usage data of previous problem analysis data associated with the defect, a size of the problem analysis data, and a confidence score associated with the previous problem analysis data, wherein the priority value is determined by calculating a weighted average of the usage data of the previous problem analysis data, the size of the problem analysis data, and the confidence score of the previous problem analysis data; and determine whether to include the problem analysis data in the debug data file based on the priority value.

18. The computer program product of claim 17, wherein the reference code is indicative of a relative severity of the defect.

19. The computer program product of claim 18, wherein the severity of the reference code is based on an association of severity data to the defect related to the reference code.

20. The computer program product of claim 17, wherein the confidence score, associated with the previous problem analysis data, is calculated based on an amount of time to resolve the defect and whether additional problem analysis data was requested to resolve the defect.

* * * * *